Nov. 23, 1926.  
A. N. CRAMER  
1,607,607  
GLASS BLOWING MACHINE  
Filed May 11. 1923   2 Sheets-Sheet 1
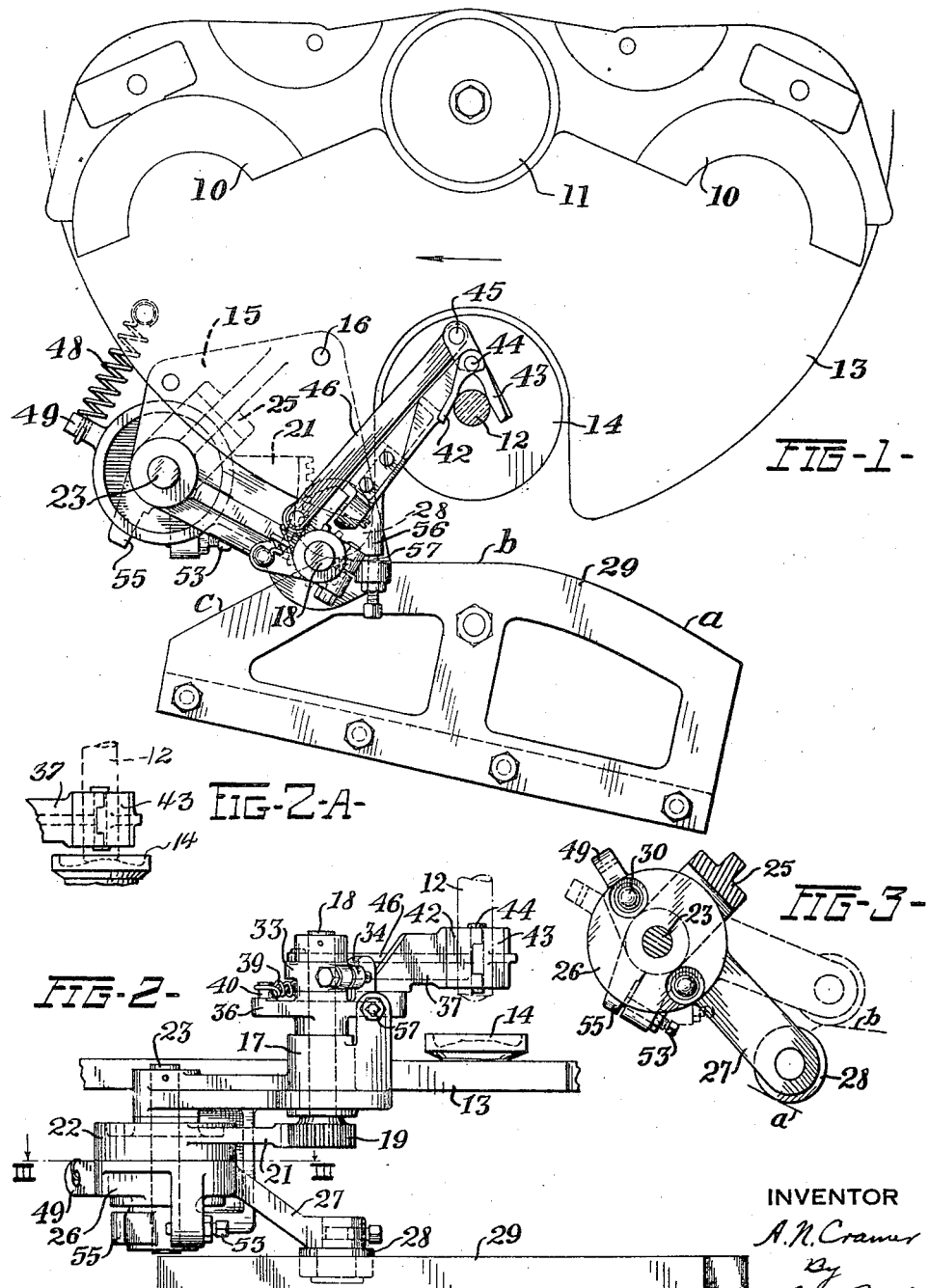
INVENTOR  
A. N. Cramer  
By  
J. F. Rule.  
His attorney.

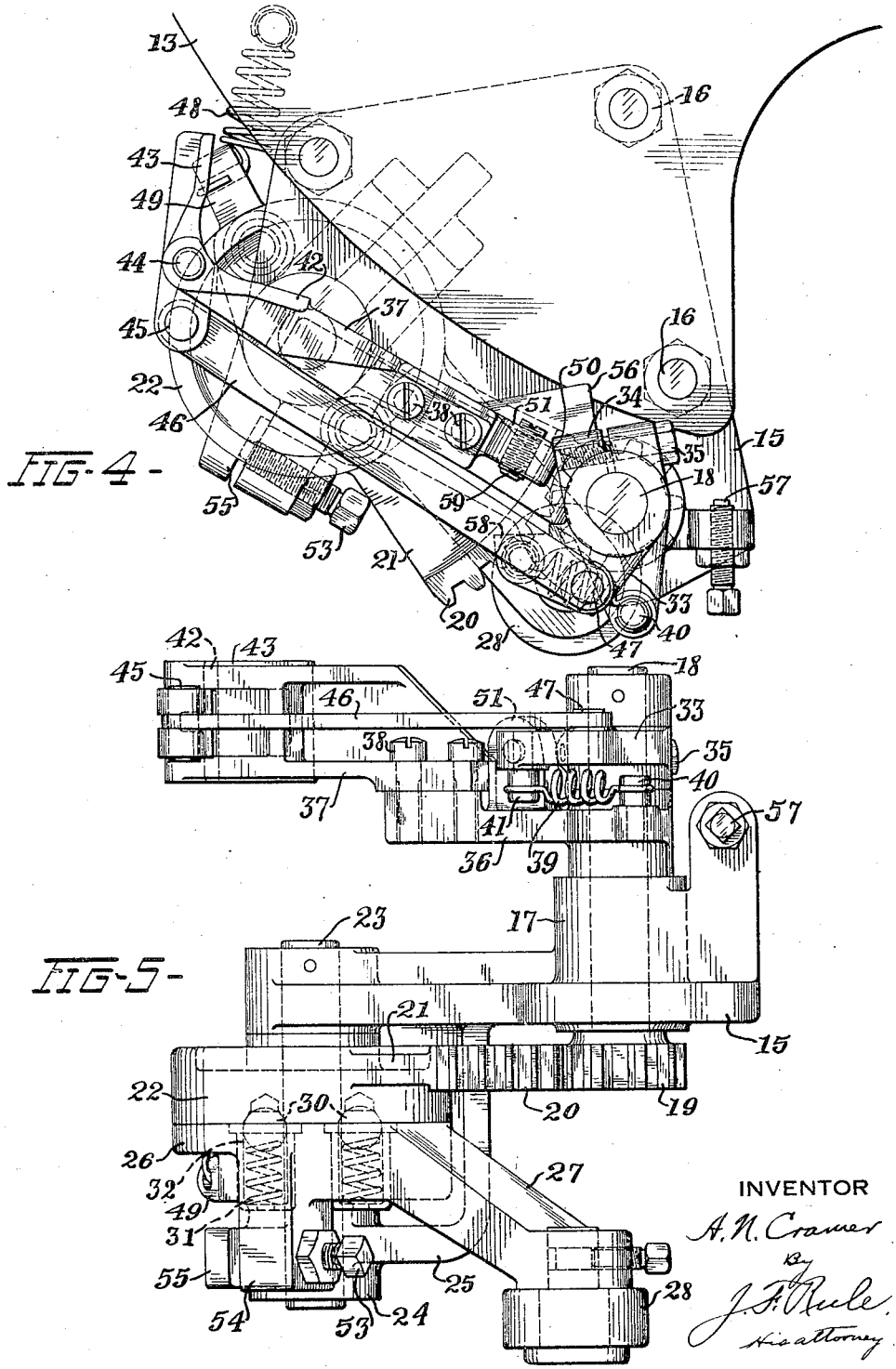

Patented Nov. 23, 1926.

1,607,607

UNITED STATES PATENT OFFICE.

ALBERT N. CRAMER, OF TOLEDO, OHIO, ASSIGNOR TO THE OWENS BOTTLE COMPANY, OF TOLEDO, OHIO, A CORPORATION OF OHIO.

GLASS-BLOWING MACHINE.

Application filed May 11, 1923. Serial No. 638,168.

My invention relates to automatic machines for blowing glass bottles or other hollow glass articles. It is customary in such machines to introduce each charge of glass into a combined blank mold and neck mold in which a preliminary forming of the glass takes place. The blank mold is then opened, leaving the bare blank supported in the neck mold, after which a finishing mold is closed around the blank and the latter blown therein to its finished form. The bare blank, which is soft and plastic, is sometimes thrown out of its true position by action of gravity, centrifugal force, unequal cooling, or other influences, so that when the finishing mold closes, the blank is not accurately centered therein. This results in an uneven distribution of glass and other imperfections in the finished ware.

An object of the present invention is to overcome this objection by providing a practical form of centering device to position the bare blank so that it will be accurately centered within the finishing mold when the latter closes.

Other objects of the invention will appear hereinafter.

In the accompanying drawings:

Figure 1 is a plan view of a portion of a bottle blowing machine with my invention applied thereto, a blank of glass being shown in section.

Figure 2 is an elevation of the blank centering mechanism.

Figure 2A is a detail showing the mold bottom and centering device in contact with the blank.

Figure 3 is a sectional plan at the line III—III on Figure 2.

Figure 4 is a plan view showing the blank centering mechanism on a larger scale than that of Figure 1, and with the centering arm withdrawn from the blank.

Figure 5 is an elevation of the same.

The invention is herein shown as applied to a glass blowing machine which may include an annular series of molds (only one of which is herein shown), each mold comprising sections 10 mounted to swing about the axis of a pivot pin 11 for opening and closing the mold. The mold sections when brought together enclose the blank 12 of plastic glass suspended from a neck mold (not shown) after which the blank is blown to hollow form within the mold. The finishing mold is supported on a carrying plate 13. A mold bottom 14 cooperates with the mold sections 10 to enclose the blank.

In some types of glass blowing machines, the blank is formed in an inverted blank mold and the latter then opened leaving the blank projecting upward from the neck mold. The neck mold is then rotated about a horizontal axis to swing the bare blank downward to the vertically depending position shown in Figures 1 and 2. As the bare blank is thus inverted, there is a tendency for it to be swung beyond the vertical position, owing to its weight and inertia, the glass at this time being soft and plastic. My invention is herein shown as arranged to center a blank on a machine of this type, the centering device being arranged to engage a blank on the side toward the center of the machine. It will be understood, however, that the centering device could be arranged to engage the blank at any point around the circumference corresponding to the direction in which there is a tendency for the blank to be thrown out of alignment, this direction being different in different types of machines.

The centering mechanism is herein shown as mounted on a plate 15 attached by bolts 16 to the mold supporting plate 13. The plate 15 is formed with a bearing sleeve 17 in which is journalled a vertical rock shaft 18. Keyed to the lower end of the rock shaft is a pinion 19 driven by a rack 20 on an arm 21 projecting from a hub 22 mounted to rotate on a rock shaft 23 keyed to the supporting plate 15 and projecting downwardly therefrom. The lower end of the shaft 23 has a bearing in a sleeve 24 formed on a web 25 on the lower side of the plate 15.

Beneath the hub 22 is a hub 26 rotatable on the shaft 23 and carrying an integral arm 27, at the outer end of which is a cam roll 28 adapted to run on a cam 29. A driving connection between the arm 27 and the arm 21 is provided by means of balls 30 which seat in sockets in the hub 22. Said balls are held in their sockets by coil springs 31 in bearing cups 32 supported in the hub 26, into which cups the balls 30 also project. This arrangement provides a safety connection between the arms 21 and 27, permitting the latter to move independently of the arm 21 in the event of any obstruction to the movement of the latter, thereby preventing injury or breakage of the centering mechanism.

Fixed to the rock shaft 18 is an arm 33 formed with a split sleeve to embrace the shaft, said sleeve terminating in lugs 34 which are drawn together by a screw bolt 35 to clamp the rock arm to the shaft. Beneath the rock arm 33 is a blank centering arm 36 loosely mounted on the shaft 18. This arm comprises an outer section 37 secured to the inner section by screws 38. A yielding driving connection between the arm 33 and the arm 36 is provided by a coil spring 39 attached at its ends to lugs 40 and 41 on the arms 36 and 33 respectively. The arm 33 forms a driver for the centering arm. Formed on the outer end of the arm 37 is one member or finger 42 of a pair of blank centering fingers. The other finger 43 is mounted to swing about a pivot pin 44 on the arm 37. Said finger 43 is extended beyond its pivot and connected by a pivot pin 45 to a link bar 46 extending parallel with the arm 36, 37 and connected at its opposite end by a pivot pin 47 to the rock arm 33. The blank centering arm, except when under the control of the cam 29, is held in the retracted position shown in Figure 4, by a coil spring 48 connected at its opposite ends respectively to the plate 13 and a lug 49 on the hub 26. The rotative movement of the arm 21 under the influence of the spring 48 is limited by an adjustable stop screw 53 in an arm 54 depending from the hub 26, said stop screw cooperating with a stop lug 55 projecting from the bearing sleeve 24. The centering fingers 42, 43 are at this time held in their wide open position by the tension spring 39 acting through the arm 33 and link 46. The movement of the finger 43 away from the finger 42 is limited by one of the lugs 34 engaging the surface 50 of a lug 51 on the arm 36.

The operation is as follows: As the mold carriage rotates in a clockwise direction, the mold centering devices (there being one associated with each finishing mold 10) are brought successively within the influence of the stationary cam 29. The cam roll 28 first engages the inclined portion *a* of the cam, thereby moving said roll inward. This rocks the arm 27 toward the center of the machine carrying with it the arm 21, so that the rack 20 rotates the pinion 19 and shaft 18 in a clockwise direction. The rock arm 33 being fixed to the rock shaft is rotated and thereby (through the tension spring 39) swings the blank centering arm 36, 37 inward about the shaft 18 as an axis until a shoulder 56 on said arm is arrested by an adjustable stop 57 carried by the plate 15. When the centering arm is thus arrested, the rock arm 33 continues its movement and through the link 46 rotates the finger 43 inward toward the finger 42 so that said fingers 42 and 43 assume the position shown in Figure 1. In this position, they serve to arrest the movement of the blank 12 as the latter swings downward to vertical position and thereby center the blank in respect to the mold bottom 14. The rotative movement of the rock arm 33 as the finger 43 swings inward, is limited by a shoulder 58 on said arm coming in contact with an adjustable stop 59 in the lug 51 on the arm 36. By adjusting the stop 59, the distance between the blank centering fingers can be accurately adjusted. The operative position of the centering arm can also be accurately adjusted by adjusting the stop 57.

After the centering arm has been swung to operative position (Fig. 1) it is held in such position during the travel of the cam roll along a dwell portion *b* of the cam. While the arm is thus held, the mold bottom 14 moves up to operative position (Fig. 2ᴬ), in which position it engages the blank and holds it in centered position until it is blown in the finishing mold. When the cam roll reaches the inclined portion *c* of the cam, the rock arm 21 commences to swing outward under the influence of the spring 48, so that the rack 20 rotates the pinion 19 and shaft 18 in a counter-clockwise direction. The rock arm 33 is thus rotated and during its initial movement operates through the link 46 to swing the finger 43 outward or to open position. When this opening movement of the finger is arrested by the lug 34 coming in contact with the stop surface 50 on the lug 51, the centering arm swings bodily outward and permits the finishing mold to close around the blank which is at this time held in its centered position by the mold bottom. The outward movement of the centering arm is arrested by the stop 53 engaging the lug 55, with the parts in the Figure 4 position.

Modifications may be resorted to within the spirit and scope of my invention.

What I claim is:

1. The combination with a mold, of means to support a bare blank of glass in position to be enclosed in the mold, and means for centering the blank in said position comprising, in combination, a centering arm, fingers carried thereby, automatic means to move said arm to operative position in relation to the blank while the latter is supported by said supporting means, and means to effect a relative movement of said fingers into and out of operative position.

2. The combination with a mold, of means to support a bare blank of glass in position to be enclosed in the mold, and means for centering the blank in said position comprising, in combination, a centering arm, fingers carried thereby, automatic means to move said arm to operative position in relation to the blank while the latter is supported by said supporting means, and automatic means to then relatively move said fingers to blank centering position.

3. In a glass blowing machine, the combination of a mold carriage, a mold thereon for enclosing a blank of plastic glass, a support for the bare blank, and mechanism mounted on the carriage for centering the blank, said mechanism comprising an arm, means to move said arm into operative relation to the blank, blank centering fingers on said arm, and automatic means to move said fingers relatively to the arm and thereby cause them to engage the bare blank while the latter is held by said support and position it so that it will be in a central position within the mold when enclosed by the mold.

4. In a glass blowing machine, the combination of a mold carriage, a mold thereon for enclosing a blank of plastic glass, a support for the bare blank, and mechanism mounted on the carriage for centering the blank, said mechanism comprising an arm, means to move said arm into operative relation to the blank, blank centering fingers on said arm, and means to effect a relative movement of said fingers into blank centering position after said arm is in operative relation to the blank and cause said fingers to engage the bare blank while the latter is held by said support and position it so that it will be in a central position within the mold when enclosed by the mold.

5. In a glass forming machine, the combination of a mold support, a mold thereon, means to hold a bare blank in position to be enclosed by the mold, a blank centering arm mounted on said support, automatic means to rotate said arm into and out of blank centering position, blank centering means carried by said arm, and means controlled by said movement of the arm to move said centering means relatively to the arm and thereby cause said centering means to center the bare blank while held by said holding means and by a movement of the blank relative to the holding means.

6. The combination of means for supporting a bare blank of plastic glass, a mold to enclose the blank, means for positioning the blank relatively to the enclosing position of the mold, said means comprising an arm having a blank engaging surface, means to actuate said arm and bring said surface into blank engaging position, a positioning device carried by said arm and having a surface to engage the blank, and automatic means to move said positioning device relatively to the arm when the arm is moved to operative position and thereby position the bare blank while the latter is held by said supporting means.

7. The combination of means to hold a bare blank of glass at one end with the bare blank projecting from its support, mechanism for positioning the blank, comprising an arm, means to swing the arm into engagement with the projecting portion of the blank, a finger pivoted to said arm, and means actuated by the movement of said arm to swing said finger about its pivot into operative position for engaging the projecting glass and moving or bending it to a predetermined position relative to its support.

8. A blank positioning device comprising a pivoted arm, a finger pivoted to said arm, a driver for rotating the arm about its pivot, a spring connection between said driver and arm through which the driver operates, a stop to arrest the arm in operative relation to the blank before the driver has completed its movement, and connecting means between the driver and said finger to move the finger into operative position after said arm is arrested.

9. In blank centering mechanism, the combination of a cam, a rock arm actuated by the cam, a second rock arm, said arms mounted to rock about a common axis, means forming a driving connection between said arms and permitting independent rotation of the arms under abnormal pressure, and a blank centering device actuated by said second arm.

10. In glass forming mechanism, the combination with a mold, of a blank centering device comprising a centering arm, a rock shaft on which said arm is mounted, a pinion on the rock shaft, a rack to drive said pinion, a cam, and operating connections between said cam and rack.

11. In glass forming mechanism, the combination with a mold, of a blank centering device comprising a centering arm, a rock shaft on which said arm is mounted, a pinion on the rock shaft, a rack to drive said pinion, a cam, operating connections between said cam and rack, a finger pivoted to said centering arm, and means actuated by the rotation of said rock shaft to actuate said finger.

12. In a glass forming machine, the combination of means for supporting a suspended blank of plastic glass, a blank centering device movable into position to engage the blank, a mold including a mold bottom movable into position to engage the lower end of the blank while the centering device is in contact therewith, and means to then withdraw the centering device, leaving the blank held in centered position by the mold bottom.

13. In a glass forming machine, the combination of a neck mold operative to support a blank of plastic glass depending therefrom, a finishing mold comprising separable sections and a mold bottom, the latter movable upward into engagement with the lower end of the blank, a blank centering arm, means to swing it laterally into position to engage and center the blank, and means to withdraw said arm after the blank is engaged by the mold bottom, leaving the blank held in centered position by said bottom while the mold closes around the blank.

Signed at Toledo, in the county of Lucas and State of Ohio, this 5 day of May, 1923.

ALBERT N. CRAMER.